(No Model.) 7 Sheets—Sheet 1.

W. A. LORENZ & W. H. HONISS.
PAPER BAG MACHINE.

No. 333,647. Patented Jan. 5, 1886.

Witnesses:
Frank H. Purpont
Edward E. Claussen

Inventors:
William A. Lorenz,
William H. Honiss.

(No Model.) 7 Sheets—Sheet 3.

W. A. LORENZ & W. H. HONISS.
PAPER BAG MACHINE.

No. 333,647. Patented Jan. 5, 1886.

Witnesses:
Frank H. Pierpont
Edward E. Claussen

Inventors:
William A. Lorenz
William H. Honiss (No Model.) 7 Sheets—Sheet 4.

W. A. LORENZ & W. H. HONISS.
PAPER BAG MACHINE.

No. 333,647. Patented Jan. 5, 1886.

Witnesses:
Frank H. Pierpont
Edward E. Claussen

Inventors:
William A. Lorenz
William H. Honiss (No Model.) 7 Sheets—Sheet 5.
W. A. LORENZ & W. H. HONISS.
PAPER BAG MACHINE.
No. 333,647. Patented Jan. 5, 1886.
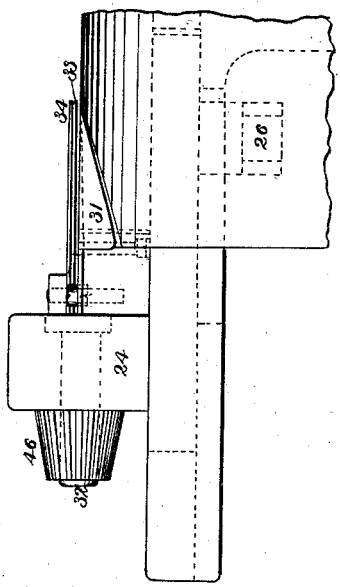
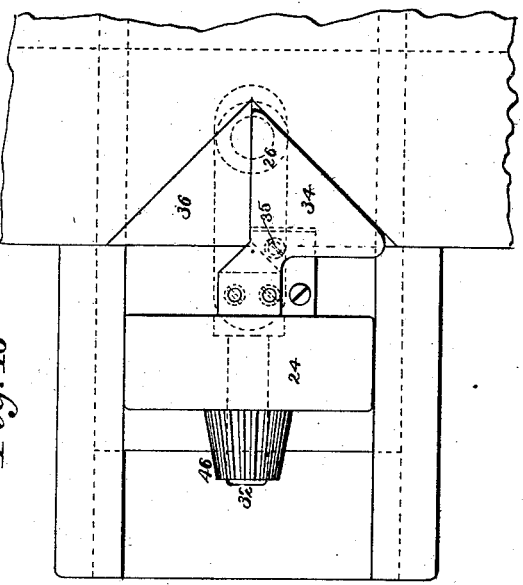
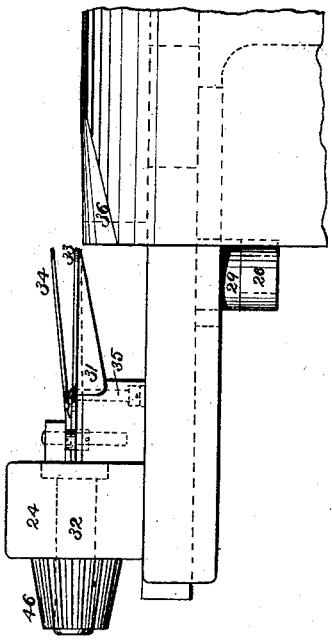
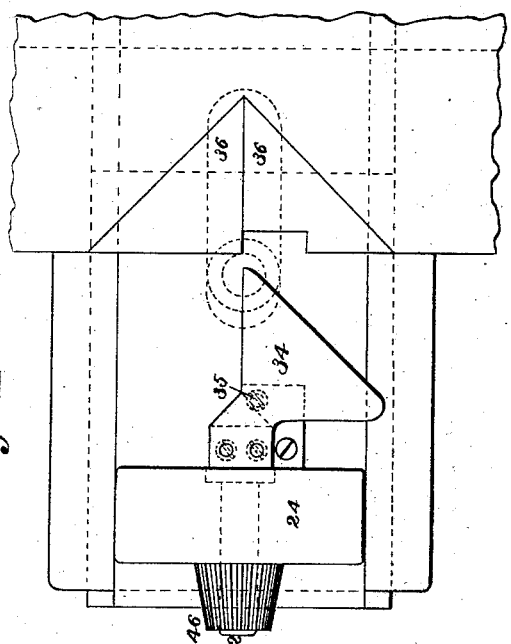
Witnesses.
Frank H. Pierpont
Edward E. Claussen
Inventors:
William A. Lorenz.
William H. Honiss.

(No Model.) 7 Sheets—Sheet 6.

W. A. LORENZ & W. H. HONISS.
PAPER BAG MACHINE.

No. 333,647. Patented Jan. 5, 1886.

Witnesses:
Frank H. Pierpont
Edward E. Claussen

Inventors:
William A. Lorenz
William H. Honiss (No Model.) 7 Sheets—Sheet 7.

W. A. LORENZ & W. H. HONISS.
PAPER BAG MACHINE.

No. 333,647. Patented Jan. 5, 1886.

Witnesses:
Frank H. Pierpont
Edward E. Claussen

Inventors:
William A. Lorenz
William H. Honiss

UNITED STATES PATENT OFFICE.

WILLIAM A. LORENZ AND WILLIAM H. HONISS, OF HARTFORD, CONNECTICUT, ASSIGNORS TO FELIX W. LEINBACH AND CLARENCE A. WOLLE, BOTH OF BETHLEHEM, PENNSYLVANIA.

PAPER-BAG MACHINE.

SPECIFICATION forming part of Letters Patent No. 333,647, dated January 5, 1886.

Application filed November 12, 1884. Serial No. 147,754. (No model.)

*To all whom it may concern:*

Be it known that we, WILLIAM A. LORENZ and WILLIAM H. HONISS, both of Hartford, Connecticut, have invented a certain new and useful Paper-Bag Machine, of which the following description and claims constitute the specification, and which is illustrated by the accompanying seven sheets of drawings.

This machine manufactures continuous tucked paper tubing into square-bottom paper bags, and its central feature is a continuously-rotating cylinder, upon which the bottom of the bag-blank is opened out into a box-like form, and then folded down into a diamond shape, instead of that work being done upon a reciprocating carriage, as in the machine shown in our application for Letters Patent filed May 15, 1884.

Figure 1:
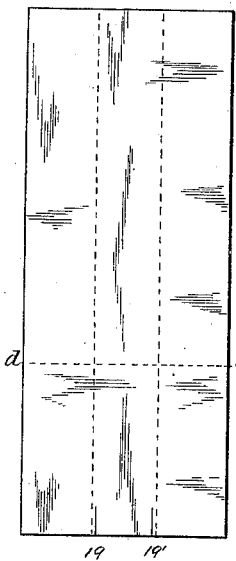
Figure 3:
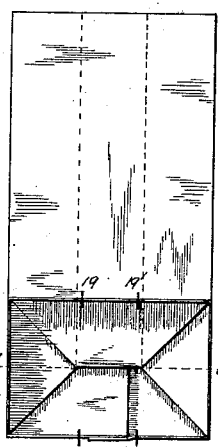
Figure 5:
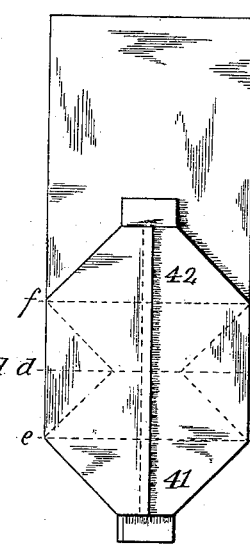
Figure 6:
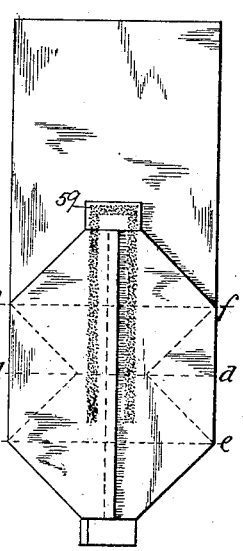
Figure 2:
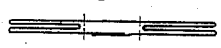
Figure 4:
Figures 7, 8, 9:
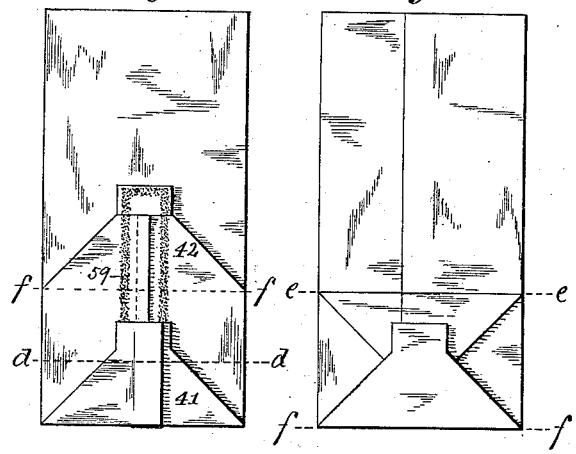
Figure 10:
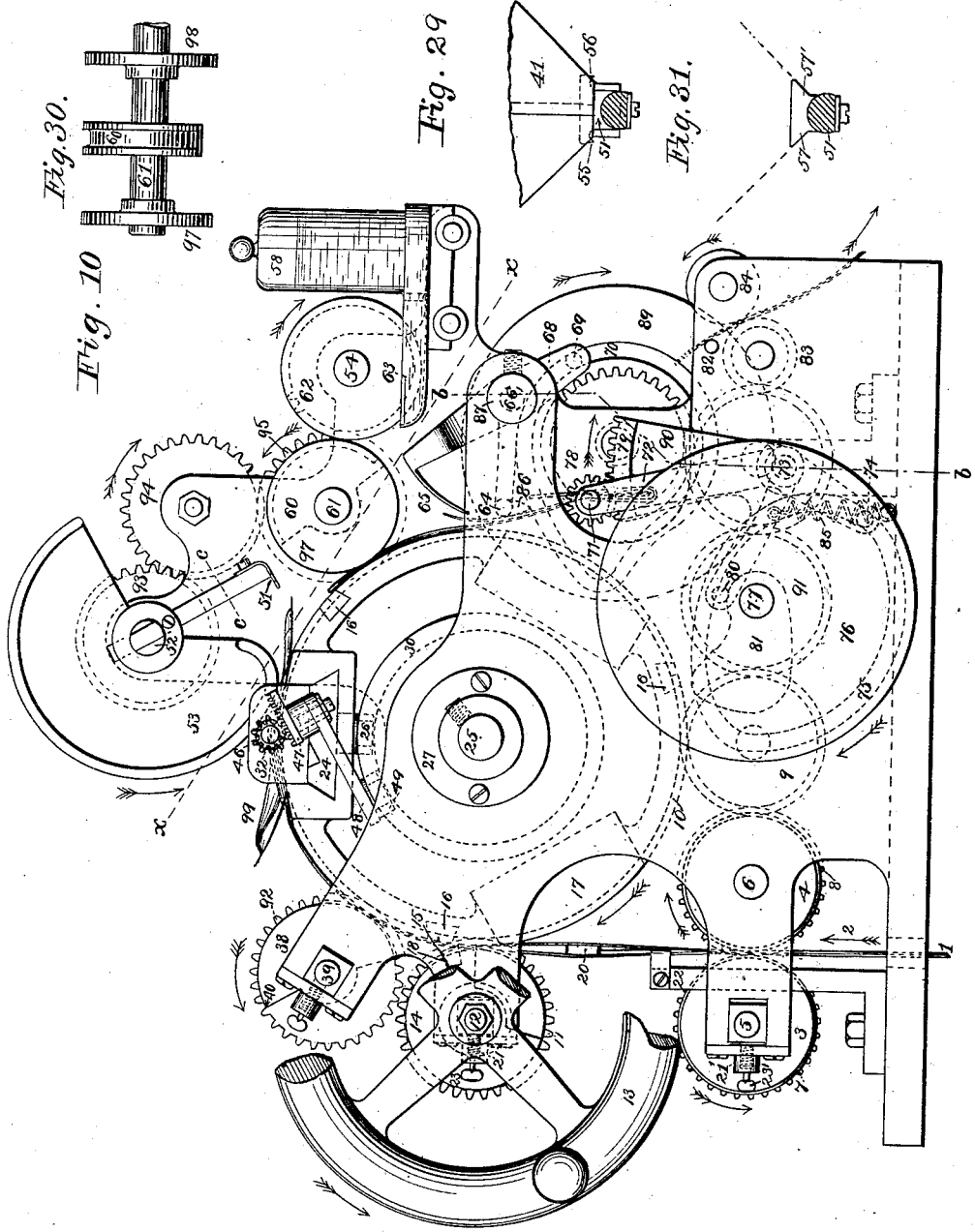
Figure 11:
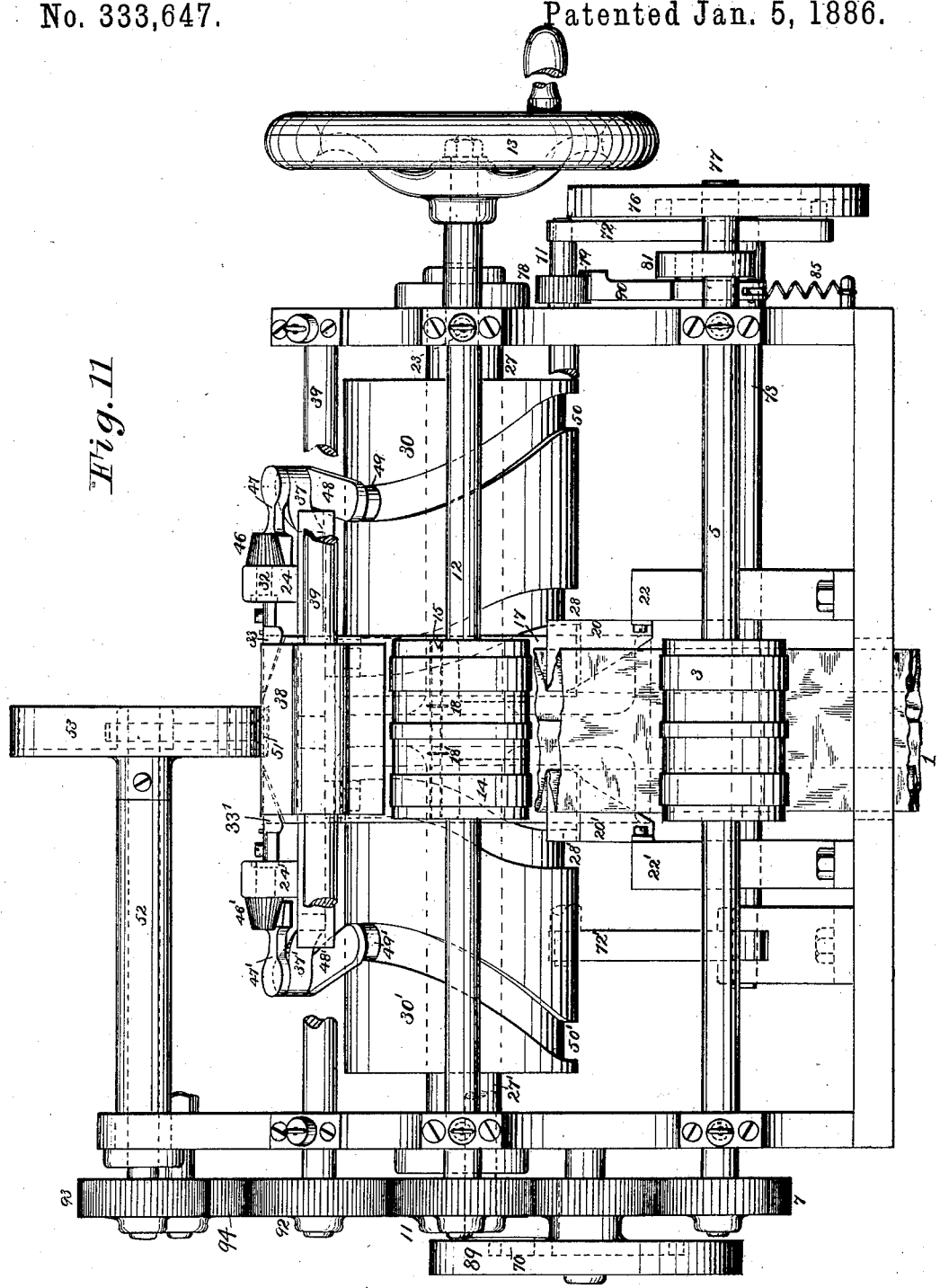
Figure 12:
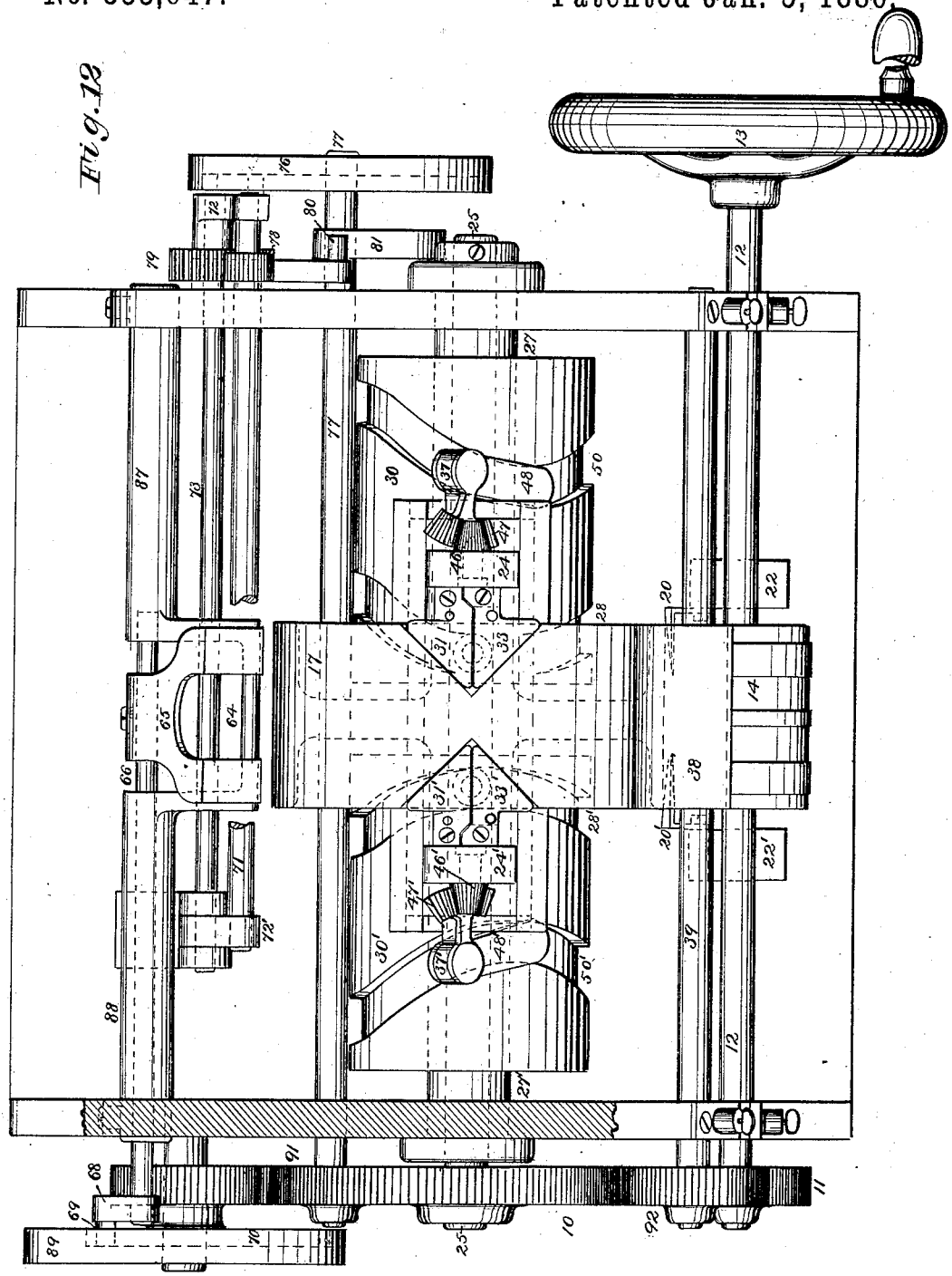
Figure 19:
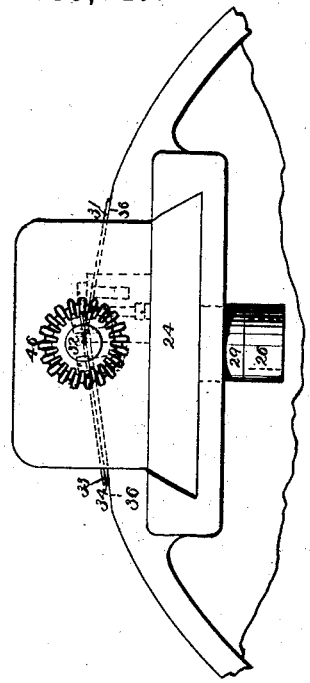
Figure 20:
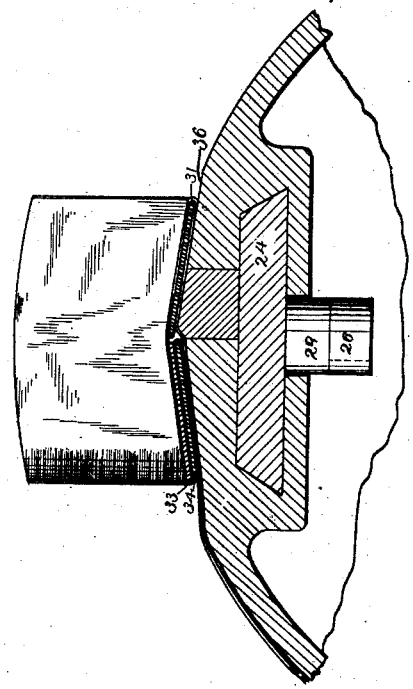
Figure 17:
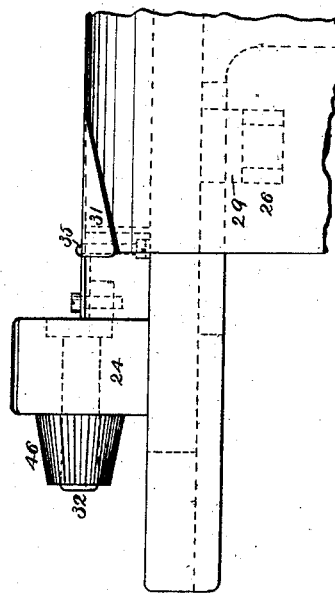
Figure 18:
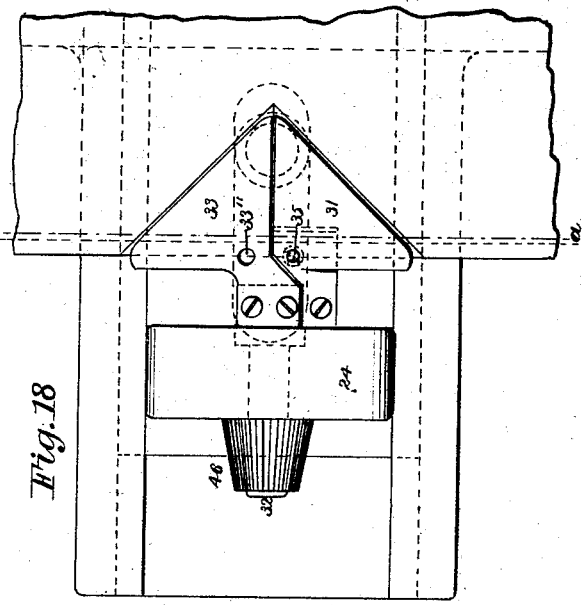
Figure 21:
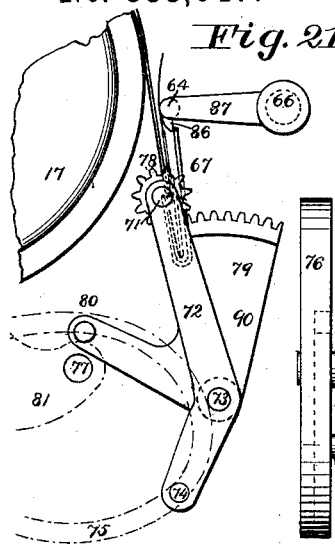
Figure 22:
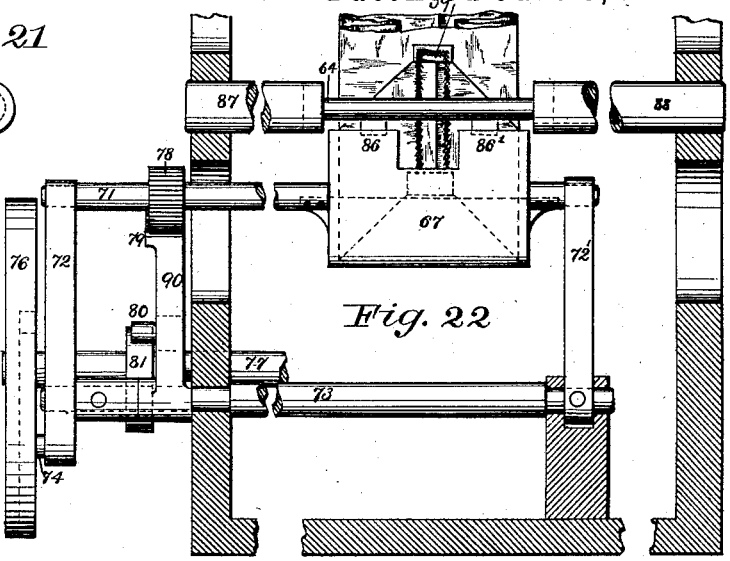
Figure 23:
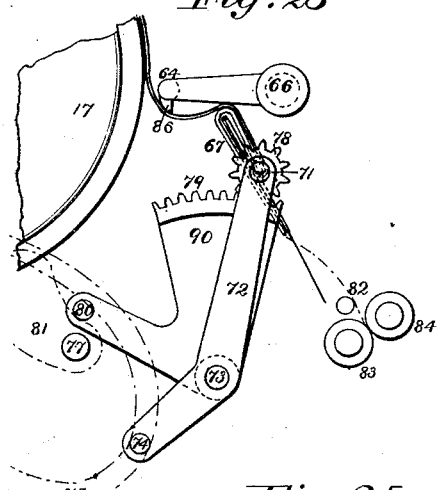
Figure 24:
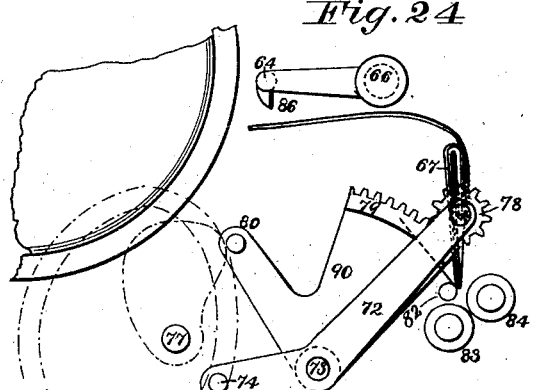
Figures 25, 27, 28:
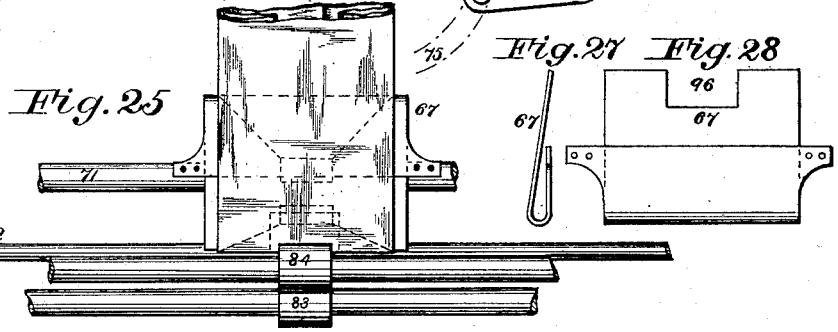

Figure 1 of the drawings is a plan view of a piece of tucked paper tubing of suitable length to make one square-bottom paper bag. Fig. 2 is an end view of the same. Fig. 3 is a plan view of the blank of Figs. 1 and 2, with its lower end opened out into a box-like form; and Fig. 4 is an end view of the blank of Fig. 3. Fig. 5 is a view of the blank of Figs. 3 and 4, with the side flaps folded down in their permanent places, and with the top and the bottom flap folded temporarily backward, so as to constitute what we call the "diamond." Fig. 6 is a view of the blank of Fig. 5, with paste applied to its upper flap and to other proper portions thereof. Fig. 7 is a view of the blank of Fig. 6, with its lower flap folded over to its permanent place. Fig. 8 is a view of the blank of Fig. 7 after the bottom of the blank has been turned over on the line of its junction with the body of the same, so as to face in the same direction as the seamed side of the body of the blank, and after the upper flap has been folded back upon the lower flap, and the bag thus completed. Fig. 9 is an isometric view of the bag of Fig. 8 opened out for filling. Fig. 10 is a side view of our new paper-bag machine. Fig. 11 is a front view of the same. Fig. 12 is a plan view of that part of the machine which is below the line X X of Fig. 10. Fig. 13 is a rear view of the left-hand member of a pair of mechanisms which open out the lower end of the blank of Figs. 1 and 2 into the box-like form shown in Figs. 3 and 4, and which mechanisms we denominate the "box-folding mechanisms," it being understood that the left-hand side of the machine is the left-hand side looking from the rear, or that side nearest the hand-wheel 13. Fig. 14 is a plan view of the mechanism shown in Fig. 13, both those figures showing that mechanism at the outward end of its reciprocating stroke. Figs. 15 and 16 are respectively a rear and plan view of the mechanism shown in Figs. 13 and 14 when it is at the inner end of its stroke, but before it has done its work there. Figs. 17 and 18 are like views of that mechanism at the inner end of its stroke and in the position it assumes in performing its folding function there. Fig. 19 is a view of the left-hand end of what is shown in Fig. 17, and Fig. 20 is a cross-section on the line *a a* of Fig. 18. Fig. 21 is a detailed side view of the reversing-pocket, and of the mechanism which works it. Fig. 22 is an upright cross-section of a portion of the machine on the line *b b* of Fig. 10, and looking to the left from that line. Fig. 23 is a detailed side view of what is shown in Fig. 21, but in a different position, and also of the mechanism which folds the upper flap, and thus completes the bag. Fig. 24 is a view of what is shown in Fig. 23, but in still another position. Fig. 25 is a fragmentary rear view of part of the mechanism shown in Fig. 24. Fig. 27 is an end view of the reversing-pocket, and Fig. 28 is a side view of the same. Fig. 29, Sheet 2, is a cross-section, looking downward, of the diamond-folder finger on the line *c c* of Fig. 10. Fig. 30 is a plan view of the pasting-disk 60 and the pressing-rolls 97 and 98, all keyed to the shaft 61. Fig. 31 is a plan of the lower end of a modified form of the diamond-folder finger.

The numeral 1 represents a fragmentary view of the tucked paper tubing being drawn from a machine adapted to manufacture it in the direction of the arrow 2 by the drawing-rolls 3 and 4, which rolls are keyed to the shafts 5 and 6, respectively, and are driven by the gears 7 and 8, respectively, and which gears receive motion through the intermediate gear, 9, and the cylinder-gear 10 from the pinion 11 on the shaft 12, and which shaft is driven by the hand-wheel 13 or by a belted pulley run by a steam-engine or other source of motion. A cutting-roll, 14, recessed at its ends, to allow space for the passage of the box-folding mechanisms, is also mounted on the shaft 12, and a knife, 15, is fastened to that cutting-roll, and severs the tucked paper tubing into bag-lengths by cutting against the rubber pad 16 on the cylinder 17. At the rear side of the knife 15, and at right angles to it, are the two slitting-knives 18 18', which cut the longitudinal slits 19 19' in the new end of the tucked paper tubing at the same time that the knife 15 severs the preceding bag-blank from that tubing. The cutting-roll 14 and the drawing-roll 3 are pressed upon the tucked paper tubing by the springs 21 and 21', respectively, which springs are respectively adjusted by the thumb-screws 23 and 23'. A pair of guides, 20 20', supported by brackets 22 22', respectively, are adapted to enter the two tucks, respectively, of the tucked paper tubing, and thus to open those tucks sufficiently to admit the fixed blades and the turning-blades of the box-folding mechanisms, as hereinafter described. The cylinder 17 is keyed to the shaft 25, and that shaft revolves within the cylindrical bearings 27 27', and is driven by the gear 10, which gear is driven by the pinion 11. The stationary cylinders 30 and 30' are keyed to the inner ends of the cylindrical bearings 27 27', respectively, and each of those stationary cylinders has upon its periphery two continuous cam-grooves, varying from each other in their curves and inclinations. The inner pair, 28 28', of these cam-grooves are counterparts of each other, as also are the outer pair, 50 50'. The function of the cam-grooves 28 and 50 is to work the box-folding mechanisms on the left-hand side of the machine, while the function of the cam-grooves 28' and 50' is to work the box-folding mechanisms of the right-hand side of the machine. The members of the pair of box-folding mechanisms are counterparts of each other, and always operate simultaneously at every step. The cylinder 17 is shown as proportioned and arranged for three pairs of such mechanisms, all run by the same cam-grooves; but only one pair is shown in the drawings, for each pair is identical with either of the others. The three pairs are to be placed at equal distances apart around the cylinder.

Inasmuch as the pair of box-folding mechanisms which are shown in the drawings are counterparts of each other, we will describe only that one of the pair which is on the left-hand side of the cylinder. The roller 26 runs in the cam-groove 28 upon the stud 29, which stud is fixed to the slide 24, and therefore forces that slide to move forward and backward in its dovetail way as the roller runs around the cam-groove 28. The fixed blade 31 is rigidly attached to the front end of the slide 24, while the turning-blade 33 and the presser-plate 34 are rigidly attached to the inner end of the shaft 32, which shaft turns in a bearing in the upward-projecting part of the slide 24, and is worked by the bevel-gear 46. That gear is worked by the sector-gear 47, which is keyed to the top of a shaft passing through the bracket 37 of the slide 24, and having its lower end keyed to the arm 48, which arm is worked by the roller 49, running in the cam-groove 50. The fixed blade, the turning-blade, and the presser-plate are so constructed and placed that their edges, which lie adjacent to each other, are substantially on a line with the axis of the shaft 32. The rotary presser 38 is keyed to the shaft 39, and is driven by the pinion 92, which in turn is driven by the gear 10. This rotary presser is in the form of a sector of a cylinder, the forward edge, 40, of which presses upon the upper surface of the tucked paper tubing just back of the place where the fixed blades and the turning-blades of the box-folding mechanisms operate in the tucks of that tubing. The diamond-sweeper 53 and the diamond-folder finger 51 are mounted on the shaft 52, which shaft is worked by the pinions 93, 94, and 95 from the gear 10. The diamond-sweeper is a disk having a sector thereof cut away, and having a flange of uniform width and of substantially the curvatures shown in Fig. 10. The diamond-folder finger terminates in a thin plate, as shown in Fig. 10, and which may have the outlines shown in Fig. 29, or those shown in Fig. 31. In the first case the plate has the two points 55 and 56 pointing in the direction in which the finger moves, and in the last case the plate has the two short beveled edges 57 and 57', which may be sharp enough to cut their way out of the diamond upon its completion. The pasting-disk 60 is keyed to the shaft 61, and is geared to revolve adjacent to the paste-distributer 62, which latter is a wheel keyed to the shaft 54, and running in the paste-basin 63, which basin is supplied by the paste-reservoir 58. The pressing-rolls 97 and 98 are also keyed to the shaft 61 on the two sides, respectively, of the pasting-disk 60. The stationary bar 64 is provided with the downward-projecting hooks 86 86', and is supported by the angular brackets 87 and 88, with which the bar and the hooks may, indeed, be integral. The shaft 66 is oscillated in proper bearings by the arm 68, which arm is worked by the stud or roller 69, running in the cam-groove 70 on the inner side of the wheel 89. The tucking-blade 65 is attached at its base to the shaft 66, so as to oscillate therewith, and is bifurcated in plan view, as shown in Fig. 12, while each of these bifurcations terminates in a curved and bent-over operating portion, as shown in Fig. 10. The reversing-pocket 67 has its shorter wall fastened to the shaft 71, which shaft oscillates in bearings in the upper ends of the arms 72 and 72', and is worked by the pinion 78, which pinion is operated by the sector-gear 79 on the upper end of the arm 90. The arms 72 and 72' are keyed to the shaft 73, while the arm 90 turns loosely upon that shaft. The arm 72 is worked by the roller 74, pivoted thereto and running in the cam-groove 75, cut on the inner side of the wheel 76, which wheel is keyed to the shaft 77, and is run by the gear 91. The arm 90 is worked by the roller 80, pivoted thereto and running around the revolving cam 81, and held in contact therewith by the spring 85. The cam 81 is keyed to and run by the shaft 77. The fixed bar 82 passes from side to side of the machine parallel with the delivery-rolls 83 and 84 and adjacent thereto in substantially the position shown in Figs. 23 and 24. The delivery-rolls are run by a gear keyed to the shaft of one of them and connected with other gearing of the machine, so as to revolve in the proper direction.

The mode of operation of this machine is as follows: Continuous tucked paper tubing is continuously drawn into the machine by the drawing-rolls 3 and 4. Thence it passes by the guides 20 20', and thence between the cutting-roll 14 and the cylinder 17, and thence between the rotary presser 38 and the cylinder 17. Immediately after leaving the guides 20 20' the tucks of the paper tubing are entered by the fixed blade and the turning-blade of each member of a pair of box-folding mechanisms. To show how that pair of mechanisms operate upon the paper tubing, it is only needful to explain the operation of the left-hand member thereof, which we will now do. The carriage or slide 24 being forced by the cam-groove 28 toward the inner end of its stroke, while the fixed blade 31, the turning-blade 33, and the presser-plate 34 lie one above another, as shown in Figs. 13 and 14, and while the presser-plate is held out of contact with the turning-blade by the stud 35, fixed in the slide 24, and passing through the hole 33'', Fig. 18, in the turning-blade, the fixed blade and the turning-blade enter the adjacent tuck of the paper tubing, while the presser-plate passes above that tubing. Thereupon the cam-groove 50 forces the roller 49, the arm 48, the sector 47, the bevel-gear 46, and the shaft 32 to turn over the turning-blade and the presser-plate together into the position shown in Figs. 17 and 18. As soon as this turning over begins, the presser-plate, being relieved from the support of the stud 35, springs hard down upon the turning-blade, thus clasping the upper fold of the tuck of the paper tubing between them, while the lower fold of that tuck is held firmly down upon the flat surface 36 of the periphery of the cylinder 17 by the fixed blade 31. As this folding over progresses, that edge of the presser-plate which is substantially on a line with the axis of the shaft 32, together with the corresponding edge of the presser-plate of the right-hand member of the pair of box-folding mechanisms, serves to define the line d d of Figs. 1, 3, 5, 6, and 7. The result of this turning over and of the corresponding simultaneous turning over of the right-hand member of the pair of box-folding mechanisms is to open out the lower end of the blank of Figs. 1 and 2 into the box-like form shown in Figs. 3 and 4. Then the diamond-folder finger 51, revolving in the direction of the arrow adjacent to the diamond-sweeper 53 in Fig. 10, comes in contact with the inner side of the forward wall of the box-like form shown in Figs. 3 and 4, and as it continues to revolve draws the box-like form down toward the diamond form of Fig. 5 by means of the pointed or beveled edges of the thin plate, serving to define the diagonal creases upon which the forward end of the diamond is folded down, and by means of the inward strain on the side walls of the box-like form, which strain is caused by the drawing down of the forward wall, and which causes the drawing down of the rear wall of the box-like form into the intermediate form, 99, shown in Fig. 10. The two side flaps of the diamond are thus folded over the rear border of the thin plate, and, on the completion of the forward end of the diamond, the pointed or beveled edges of the thin plate cut their way out, by reason of the greater speed of the end of the finger than that of the cylinder which carries forward the bag-blank. The flange of the diamond-sweeper then flattens the intermediate form, 99, down into the completed diamond of Fig. 5, and holds its flaps in position till the forward end of the diamond passes under the pasting-disk and the pressing-rolls 97 and 98. The cam-grooves 28 28' and 50 50' operate to withdraw the fixed blades 31 31', the folder-blades 33 33', and the presser-plates 34 34' from all contact with the paper after the diamond is formed, and also to return the turning-blades and the presser-plates to the position shown, as to the left-hand set thereof in Figs. 13 and 14, while the pasting-disk 60 applies paste at 59 to the diamond, as shown in Fig. 6, and while the diamond passes under the pressing-rolls 97 and 98. The forward end of the diamond then passes to the right-hand side of the bar 64, as shown in Fig. 10, at the same time that the reversing-pocket 67 is in the position shown in Fig. 21, in which position the longer wall of the reversing-pocket being caught by the hooks 86 86', as shown in Figs. 21 and 22, is sprung somewhat farther away from the shorter wall than when in its normal position relatively to that wall, as shown in Fig. 27. Then the tucking-blade 65 strikes the presented surface of the diamond on the outer end of the line e e of Fig. 6, and tucks the diamond over the bar 64, whence its thus doubled portion is forced by the action of the cylinder 17 and the pressing-rolls 97 and 98 into the reversing-pocket 67, the longer wall of that reversing-pocket being provided with the recess 96, so that it may not cover any part of the pasted surface of the diamond. Then the reversing-pocket is carried into the position shown in Fig. 23, by the action of the cam-groove 75 upon the arms 72 72', while the pocket is turned over into its position shown in the same figure by the action of the cam 81 upon the arm 90, and thus upon the sector-gear 79 and the pinion 78. When the longer wall of the reversing-pocket is thus released from the hooks 86 86', it springs toward the shorter wall, so as to clasp the forward end of the blank of Fig. 7 between the two. As the pocket turns over, the upper edge of its shorter wall constitutes the defining-line upon which the bottom of the blank shown in Fig. 7 is turned over, so as to face in the same direction as the seamed side of that blank. That defining-line makes a crease in the seamed side of the bag on the line $d\,d$ of Fig. 7. Thereupon the reversing-pocket is carried by the arms 72 72' and their connected mechanism into the position shown in Figs. 24 and 25. What was before the rear end of the diamond has now become its forward end, and that end, as it is carried forward by the reversing-pocket and outside of its mouth, strikes against the left-hand side of the bar 82, as shown in Figs. 23 and 24, and is thereby folded over on the line $f\,f$ of Fig. 8, by means of the edge of the longer wall of the reversing-pocket. As the reversing-pocket advances still lower than as shown in Fig. 24, that part of the forward end of the blank of Fig. 7 which is opposite the recess 96 is seized by the delivery-rolls 83 and 84. Those rolls thereupon draw the completed bag out of the pocket, and in doing so press the folds which compose the bottom of the bag firmly together on the zone of the pasted surfaces thereof.

We claim as our invention—

1. The combination of the revolving cylinder 17 with one or more pairs of box-folding mechanisms, constructed substantially as described attached thereto and revolving therewith, substantially as described.

2. The combination of the fixed blade 31', the turning-blade 33, and the presser-plate 34, constructed and arranged substantially as described, and operating substantially as explained.

3. The combination of the slide 24, the shaft 32, the fixed blade 31, the turning-blade 33, and the presser-plate 34, all substantially as described.

4. The combination of the turning-blade 33 with the presser-plate 34, both operating together to clasp the upper fold of the tuck of the paper tubing and to turn it over upon itself, substantially as described.

5. The combination of the presser-plates 34 and 34', arranged with their axial edges on a line with each other and with the axes of the shafts 32 and 32', and operating, when turned over on their axial edges, to define the line $d\,d$ of the blank of Fig. 3, all substantially as described.

6. The rotary presser 38, constructed in the form of a sector of a cylinder, so as to allow the passage of the fixed blades, the turning-blades, and the presser-plates beneath it, and so as immediately after their passage to press the forward edge, 40, upon the tucked paper tubing in their rear, and thus to hold it firmly while it is being entered by the pair of box-folding mechanisms, all substantially as described.

7. The combination of the fixed blades 31 31' and the turning-blades 33 33', operating to firmly hold the bottom of the box-like form, with the diamond-folder finger 51 and the diamond-sweeper 53, operating to fold the walls of the box-like form of Figs. 3 and 4 down into the diamond form of Fig. 5, all substantially as described.

8. The combination of the diamond-folder finger 51, the shaft 52, the cylinder 17, and the shaft 25, all operating together substantially as described.

9. The reversing-pocket 67, oscillating on an axis and having its longer wall as much longer than the other as the width of the bottom of the bag exceeds half that width, all substantially as shown and described.

10. The combination of the arms 72 and 72', worked by the cam-groove 75 and carrying the pinion 78, with the arm 90, worked by the cam 81 and carrying the sector-gear 79, and with the reversing-pocket 67, all substantially as described.

WILLIAM A. LORENZ.
WILLIAM H. HONISS.

Witnesses:
ALBERT H. WALKER,
FRANK A. PIERPONT.

Correction in Letters Patent No. 333,647.

It is hereby certified that in Letters Patent No. 333,647, granted January 5, 1886, upon the application of William A. Lorenz and William H. Honiss, of Hartford, Connecticut, for an improvement in "Paper Bag Machines," an error appears in the printed specification requiring correction as follows: In line 44, page 4, the reference number "31'" should be stricken out and the reference number *31* inserted instead; and that the said Letters Patent should be read with this correction therein that the same may conform to the record of the case in the Patent Office.

Signed, countersigned, and sealed this 12th day of January, A. D. 1886.

[SEAL.]

H. L. MULDROW,
*Acting Secretary of the Interior.*

Countersigned:
    M. V. MONTGOMERY,
        *Commissioner of Patents.*